US012440934B2

(12) United States Patent
Persson

(10) Patent No.: US 12,440,934 B2
(45) Date of Patent: Oct. 14, 2025

(54) POSITIONING APPARATUS AND SYSTEM

(71) Applicant: ABB Schweiz AG, Baden (CH)

(72) Inventor: Stig Olov Persson, Västerås (SE)

(73) Assignee: ABB Schweiz AG, Baden (CH)

( * ) Notice: Subject to any disclaimer, the term of this patent is extended or adjusted under 35 U.S.C. 154(b) by 390 days.

(21) Appl. No.: 18/245,424

(22) PCT Filed: Sep. 23, 2020

(86) PCT No.: PCT/EP2020/076499
§ 371 (c)(1),
(2) Date: Mar. 15, 2023

(87) PCT Pub. No.: WO2022/063394
PCT Pub. Date: Mar. 31, 2022

(65) Prior Publication Data
US 2023/0347460 A1      Nov. 2, 2023

(51) Int. Cl.
*B23Q 1/66* (2006.01)
*B23Q 1/01* (2006.01)
(Continued)

(52) U.S. Cl.
CPC ............... *B23Q 1/66* (2013.01); *B23Q 1/015* (2013.01); *B23Q 1/5475* (2013.01); *B25J 9/0096* (2013.01)

(58) Field of Classification Search
CPC .. B23Q 1/01–017; B23Q 1/66; B23Q 1/5475; B23Q 1/76; B23Q 1/763; B25J 9/0084; B25J 9/0096
See application file for complete search history.

(56) References Cited

U.S. PATENT DOCUMENTS

| 4,666,363 A | 5/1987 | Johansson |
| 4,764,077 A * | 8/1988 | Susnjara ............. B05B 13/0431 414/222.03 |

(Continued)

FOREIGN PATENT DOCUMENTS

| CN | 101209552 A | 7/2008 |
| CN | 106103007 A | 11/2016 |

(Continued)

OTHER PUBLICATIONS

International Search Report and Written Opinion of the International Seacrhing Authority; Application No. PCT/EP2020/076499; Completed: Jun. 8, 2021; Mailing Date: Jun. 23, 2021; 11 Pages.

(Continued)

*Primary Examiner* — Tyrone V Hall, Jr.
(74) *Attorney, Agent, or Firm* — Whitmyer IP Group LLC

(57) ABSTRACT

A positioning apparatus for positioning workpieces in relation to at least one industrial robot, the positioning apparatus including a stationary base structure having a support surface for supporting one or more of the at least one industrial robot and a base surface for mounting to an installation surface; a first workpiece support for supporting a first workpiece; a second workpiece support for supporting a second workpiece; a support member supporting the first workpiece support and the second workpiece support, the support member being arranged to move between a first position and a second position; and a motor arranged to drive the support member between the first position and the second position, wherein the support surface is arranged between the motor and the base surface.

17 Claims, 9 Drawing Sheets

(51) Int. Cl.
  *B23Q 1/54* (2006.01)
  *B25J 9/00* (2006.01)

(56) References Cited

U.S. PATENT DOCUMENTS

| | | | |
|---|---|---|---|
| 8,413,972 B2* | 4/2013 | Osicki | B23Q 1/64 |
| | | | 269/57 |
| 2004/0138782 A1 | 7/2004 | Passmore et al. | |
| 2009/0102109 A1* | 4/2009 | Nuchter | B23K 37/04 |
| | | | 269/74 |
| 2011/0084052 A1 | 4/2011 | Larkins | |
| 2011/0140330 A1 | 6/2011 | Nishikawa et al. | |
| 2021/0086365 A1* | 3/2021 | Harada | G05B 19/4155 |

FOREIGN PATENT DOCUMENTS

| | | |
|---|---|---|
| CN | 107735217 A | 2/2018 |
| CN | 109940574 A | 6/2019 |
| CN | 209565659 U | 11/2019 |
| CN | 210208991 U | 3/2020 |
| CN | 111496433 A | 8/2020 |
| EP | 1604788 B1 | 4/2007 |
| JP | 2019181827 A | 10/2019 |
| WO | 8300828 A1 | 3/1983 |

OTHER PUBLICATIONS

International Preliminary Report on Patentability and Written Opinion of the International Searching Authority; Application No. PCT/EP2020/076499; Completed: Mar. 28, 2023; 7 Pages.

Chinese First Office Action; Application No. 202080105210.0; Completed: Sep. 9, 2024; 12 Pages.

* cited by examiner

POSITIONING APPARATUS AND SYSTEM

TECHNICAL FIELD

The present disclosure generally relates to a positioning apparatus. In particular, a positioning apparatus for positioning workpieces in relation to at least one industrial robot, and a system comprising an industrial robot and a positioning apparatus, are provided.

BACKGROUND

Some positioning apparatuses for positioning workpieces in relation to one or more industrial robots comprise a vertical interchange axis, a processing side where a first workpiece can be processed by the one or more industrial robots, and a loading side for loading/unloading a second workpiece at the same time as the first workpiece is processed.

By using several industrial robots, the processing time at the processing side can be reduced. However, in case all industrial robots are provided outside the positioning apparatus, typically only a maximum of two industrial robots can be used on the processing side. The width of the workpiece limits the number of industrial robots that can be provided for processing the workpiece. Some prior art systems employ one or more industrial robots above the positioning apparatus. With these systems, the processing time can be further reduced.

EP 1604788 B1 discloses a robot positioned on top of a horizontal element of a carrying frame with three vertical columns. Tables carrying workpieces can be individually rotated in a frame with two lateral elements, each accommodating a drive unit. A third column is positioned between the tables and can be combined with a base of a positioning device.

SUMMARY

One object of the present disclosure is to provide a positioning apparatus for positioning workpieces in relation to at least one industrial robot, which positioning apparatus has a compact design.

A further object of the present disclosure is to provide a positioning apparatus for positioning workpieces in relation to at least one industrial robot, which positioning apparatus enables reduction of a height of a system comprising the positioning apparatus and one or more industrial robots supported on the positioning apparatus.

A still further object of the present disclosure is to provide a positioning apparatus for positioning workpieces in relation to at least one industrial robot, which positioning apparatus simplifies routing of cables to one or more industrial robots supported on the positioning apparatus.

A still further object of the present disclosure is to provide a positioning apparatus for positioning workpieces in relation to at least one industrial robot, which positioning apparatus enables a positioning of a workpiece on a loading side close to the installation surface, e.g. a low positioning of the workpiece on the loading side.

A still further object of the present disclosure is to provide a positioning apparatus for positioning workpieces in relation to at least one industrial robot, which positioning apparatus has a less complicated design.

A still further object of the present disclosure is to provide a positioning apparatus for positioning workpieces in relation to at least one industrial robot, which positioning apparatus enables an efficient processing of workpieces.

A still further object of the present disclosure is to provide a positioning apparatus for positioning workpieces in relation to at least one industrial robot, which positioning apparatus solves several or all of the foregoing objects in combination.

A still further object of the present disclosure is to provide a system comprising at least one industrial robot and a positioning apparatus, which system solves one, several or all of the foregoing objects.

According to one aspect, there is provided a positioning apparatus for positioning workpieces in relation to at least one industrial robot, the positioning apparatus comprising a stationary base structure having a support surface for supporting one or more of the at least one industrial robot and a base surface for mounting to an installation surface; a first workpiece support for supporting a first workpiece; a second workpiece support for supporting a second workpiece; a support member supporting the first workpiece support and the second workpiece support, the support member being arranged to move between a first position, where the first workpiece support is positioned on a processing side of the base structure and the second workpiece support is positioned on an opposite loading side of the base structure, and a second position, where the first workpiece support is positioned on the loading side and the second workpiece support is positioned on the processing side; and a motor arranged to drive the support member between the first position and the second position, wherein the support surface is arranged between the motor and the base surface.

When a first workpiece is supported by the first workpiece support on the processing side, the one or more industrial robots can perform an operation, such as welding, on the first workpiece. At the same time, a second workpiece can be loaded (or unloaded) to (or from) the second workpiece support on the loading side. The positioning apparatus thus enables simultaneous processing and loading/unloading of workpieces.

By arranging the support surface between the motor and the base surface, the one or more industrial robots on the support surface can be positioned closer to the installation surface. That is, a height of a system comprising the positioning apparatus and one or more industrial robots on the support surface can be reduced. By lowering the support surface in this way, the access to the workpiece on the processing side by the one or more industrial robots on the support surface is also improved. Consequently, the processing of the workpieces is made more efficient. Moreover, by lowering the support surface, also, the first workpiece support and the second workpiece support can be lowered and thereby facilitate access to the workpiece on the loading side.

The support surface and the base surface may be substantially planar, or planar. In this case, the support surface and the base surface may be substantially parallel, or parallel. Alternatively, or in addition, the support surface and the base surface may be aligned such that a normal to the base surface passes through the support surface. A normal to the base surface does however not necessarily need to pass through the motor. For example, in case the base surface is horizontal, the motor may be positioned horizontally outside the base surface. The motor may for example be an electric motor, such as an electric servomotor.

The installation surface may for example be a floor or a wall. The base structure may be fixed to the installation surface. The support member may move relative to the base structure between the first position and the second position. The support surface may be configured to support two industrial robots.

When the support member is in the first position or in the second position, also the positioning apparatus may be said to be in the first position or in the second position, respectively. The positioning apparatus may alternatively be referred to as a workpiece positioner.

The support member may be arranged to rotate about an interchange rotation axis between the first position and the second position. The support surface and the base surface may be substantially perpendicular to, or perpendicular to, the interchange rotation axis. Alternatively, or in addition, the interchange rotation axis may pass through both the support surface and the base surface. The support member may move around the base structure when moving between the first position and the second position.

The interchange rotation axis may be vertically oriented. The positioning apparatus may comprise one or more bearings for rotationally supporting the support member relative to the base structure about the interchange rotation axis.

The support member may be arranged to rotate approximately 180 degrees about the interchange rotation axis in a first direction from the first position to the second position, and to rotate approximately 180 degrees about the interchange rotation axis in a second direction, opposite to the first direction, from the second position to the first position. In this regard, approximately 180 degrees may be 135 degrees to 225 degrees, such as 170 degrees to 190 degrees.

The support member may not be able to rotate continuously in the same direction about the interchange rotation axis from the first position, to the second position and to the first position again. Instead, the support member may have to rotate in the first direction to move from the first position to the second position, and may have to rotate in the second direction to move from the second position back to the first position. The support member may thus move alternatingly in a clockwise direction and in a counterclockwise direction about the interchange rotation axis when alternatingly moving between the first position and the second position.

The positioning apparatus may further comprise a free space for guiding one or more cables from an exterior side of the positioning apparatus to the base structure. In this case, the positioning apparatus may be configured such that the free space is uninterrupted by the support member when moving between the first position and the second position. In this way, the discontinuous rotation of the support member between the first position and the second position, i.e. alternatingly in the first direction and in the second direction, is utilized to provide a simplified routing of cables.

The cables may for example comprise power cables and welding cables for one or more industrial robots provided on the support surface, and power cables for the first workpiece support and the second workpiece support.

The base structure may comprise a first opening and a second opening for guiding the one or more cables from the exterior side to the support surface. The first opening may lie between the exterior side and the second opening. The second opening may be provided in the support surface. The first opening may lie in a plane parallel with the interchange rotation axis. The base structure may further comprise a passage between the first opening and the second opening. The passage may be open vertically upwards all the way between the first opening and the second opening.

The support member may be asymmetric about a plane that is perpendicular to a separating direction between the first workpiece support and the second workpiece support and that is centered between the first workpiece support and the second workpiece support. This plane may comprise the interchange rotation axis.

The support member may comprise a first arm, a second arm and a bridging arm interconnecting the first arm and the second arm. In this case, the bridging arm may be substantially perpendicular to, or perpendicular to, each of the first arm and the second arm. The bridging arm may be offset from the plane that is perpendicular to a separating direction between the first workpiece support and the second workpiece support and that is centered between the first workpiece support and the second workpiece support. The bridging arm may be provided between the support surface and the base surface. In case the base surface is mated with a horizontal floor, the bridging arm may move below the support surface when the support member moves between the first position and the second position.

The free space may be provided between the second arm and the installation surface when the support member adopts the first position, and between the first arm and the installation surface when the support member adopts the second position.

Moreover, the bridging arm may be provided on one side of the free space when the support member adopts the first position, and on an opposite side of the free space when the support member adopts the second position. The bridging arm may move around the base structure when the support member moves between the first position and the second position.

The support surface may be symmetric about a plane that is parallel with the separating direction between the first workpiece support and the second workpiece support and that is centered between the first arm and the second arm. Also, this plane may comprise the interchange rotation axis. Alternatively, or in addition, the base surface may be asymmetric about the plane that is parallel with the separating direction between the first workpiece support and the second workpiece support and that is centered between the first arm and the second arm.

The bridging arm may be offset from the interchange rotation axis. Each of the first arm, the second arm and the bridging arm may be substantially straight, or straight.

The support member may be H-shaped. Alternatively, the support member may be a frame, such as a rigid frame.

The support surface may be positioned between the first workpiece support and the base surface, such as in a vertical direction between the first workpiece support and the base surface. Alternatively, or in addition, the support surface may be positioned between the second workpiece support and the base surface. A normal to the support surface, e.g. parallel with the interchange rotation axis, does however not necessarily need to pass through the first workpiece support and/or the second workpiece support. For example, in case the support surface is horizontal, the first workpiece support and the second workpiece support may be positioned horizontally outside the support surface.

The first workpiece support may be arranged to rotate the first workpiece about a first workpiece rotation axis. In this case, the support surface may be positioned between the first workpiece rotation axis and the base surface, such as in a vertical direction between the first workpiece rotation axis and the base surface. The second workpiece support may be arranged to rotate the second workpiece about a second workpiece rotation axis. In this case, the support surface may be positioned between the second workpiece rotation axis and the base surface. Each of the first workpiece rotation axis and the second workpiece rotation axis may be substantially perpendicular to, or perpendicular to, the interchange rotation axis. Alternatively, or in addition, each of the first workpiece rotation axis and the second workpiece rotation axis may be substantially horizontal, or horizontal. Alternatively, or in addition, each of the first workpiece rotation axis and the second workpiece rotation axis may be provided at the same height from the installation surface. Each of the first workpiece support and the second workpiece support may be configured to releasably hold a workpiece.

The support surface may be elongated. In this case, a longitudinal axis of the support surface may be substantially parallel with, or parallel with, the first workpiece rotation axis and/or the second workpiece rotation axis.

Alternatively, or in addition, the base surface may be elongated. In this case, a longitudinal axis of the base surface may be substantially parallel with, or parallel with, the first workpiece rotation axis and/or the second workpiece rotation axis.

The first workpiece support may comprise two first workpiece support elements arranged to hold a workpiece therebetween. One of the first workpiece support elements may be supported by a bearing for rotation relative to the support member about the first workpiece rotation axis. The first workpiece support may further comprise a servomotor and a reduction gearbox at the other first workpiece support element for rotationally driving the workpiece about the first workpiece rotation axis.

The second workpiece support may comprise two second workpiece support elements arranged to hold a workpiece therebetween. One of the second workpiece support elements may be supported by a bearing for rotation relative to the support member about the second workpiece rotation axis. The second workpiece support may further comprise a servomotor and a reduction gearbox at the other second workpiece support element for rotationally driving the workpiece about the second workpiece rotation axis.

The positioning apparatus may further comprise a transmission arranged to transmit a driving movement of the motor to a movement of the support member. In this case, the support surface may be arranged between the transmission and the base surface. The transmission may be a gearbox, such as a reduction gearbox connected to an output shaft of the motor.

By arranging the support surface between the transmission and the base surface, the one or more industrial robots on the support surface can be positioned further closer to the installation surface. That is, a height of a system comprising the positioning apparatus and one or more industrial robots on the support surface can be further reduced.

According to a further aspect, there is provided a system comprising at least one industrial robot and a positioning apparatus according to the present disclosure. The system may comprise one or more industrial robots provided on the processing side outside the positioning apparatus and one or more industrial robots supported on the support surface.

The system may comprise two industrial robots supported on the support surface. In this case, the motor may be positioned between the two industrial robots, such as in a horizontal direction between the two industrial robots. The system may be a welding system for welding workpieces. In this case, each industrial robot may be a welding robot.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
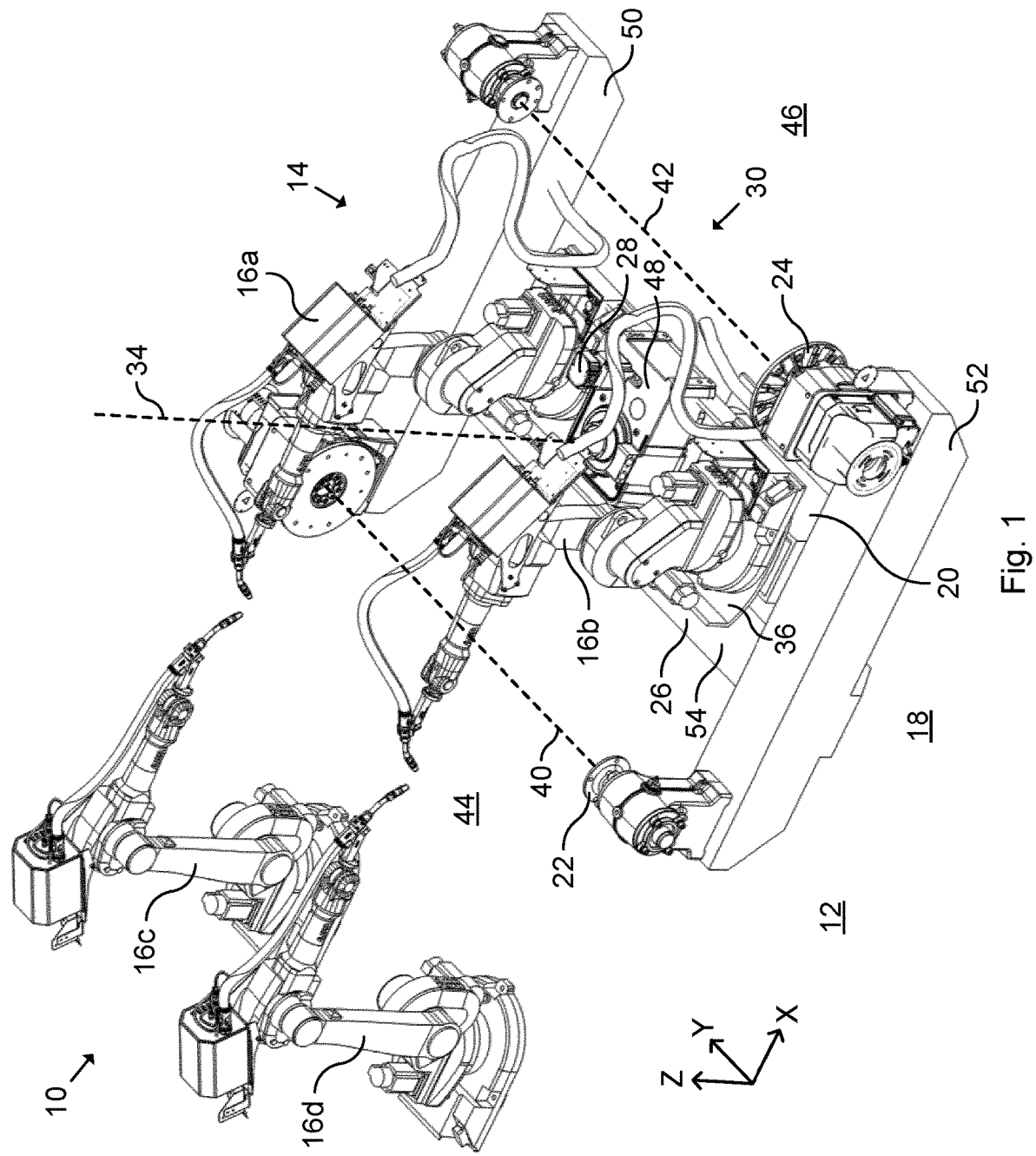
FIG. 1: schematically represents a perspective top view of a system comprising industrial robots and a positioning apparatus.

In the following, a positioning apparatus for positioning workpieces in relation to at least one industrial robot, and a system comprising an industrial robot and a positioning apparatus, will be described. The same or similar reference numerals will be used to denote the same or similar structural features.

Figure 2:
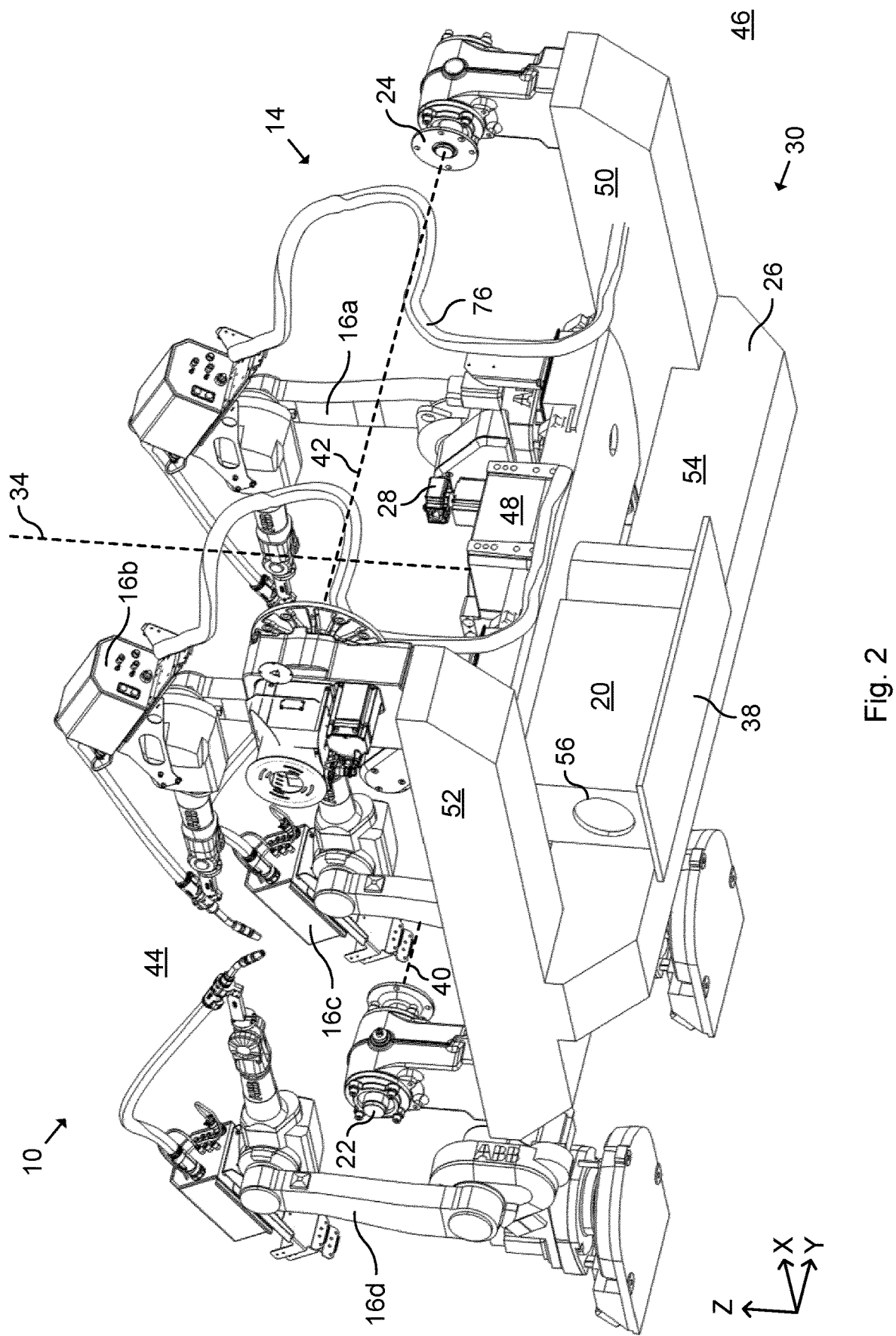
FIG. 2: schematically represents a perspective bottom view of the system.

FIG. 1 schematically represents a perspective top view of a system 10, and FIG. 2 schematically represents a perspective bottom view of the system 10. With collective reference to FIGS. 1 and 2, the system 10 of this example is provided on a horizontal floor 12. The floor 12 is one example of an installation surface according to the present disclosure.

The system 10 comprises a positioning apparatus 14. The system 10 of this example further comprises a first industrial robot 16*a*, a second industrial robot 16*b*, a third industrial robot 16*c* and a fourth industrial robot 16*d*. In this example, the third industrial robot 16*c*, the fourth industrial robot 16*d* and the positioning apparatus 14 are positioned on the floor 12. The first industrial robot 16*a* and the second industrial robot 16*b* are positioned on the positioning apparatus 14. The industrial robots 16*a*, 16*b*, 16*c* and 16*d* of this example are arc-welding robots.

FIG. 1 further shows a Cartesian coordinate system for reference purposes. The positioning apparatus 14 may however be oriented arbitrarily in space. FIG. 1 also shows an exterior side 18 of the positioning apparatus 14.

The positioning apparatus 14 is configured to position workpieces (not shown) in relation to the industrial robots 16*a*, 16*b*, 16*c* and 16*d*. The positioning apparatus 14 comprises a stationary base structure 20, a first workpiece support 22, a second workpiece support 24, a support member 26 and a motor 28. The first workpiece support 22 and the second workpiece support 24 are supported on the support member 26.

Figure 8:
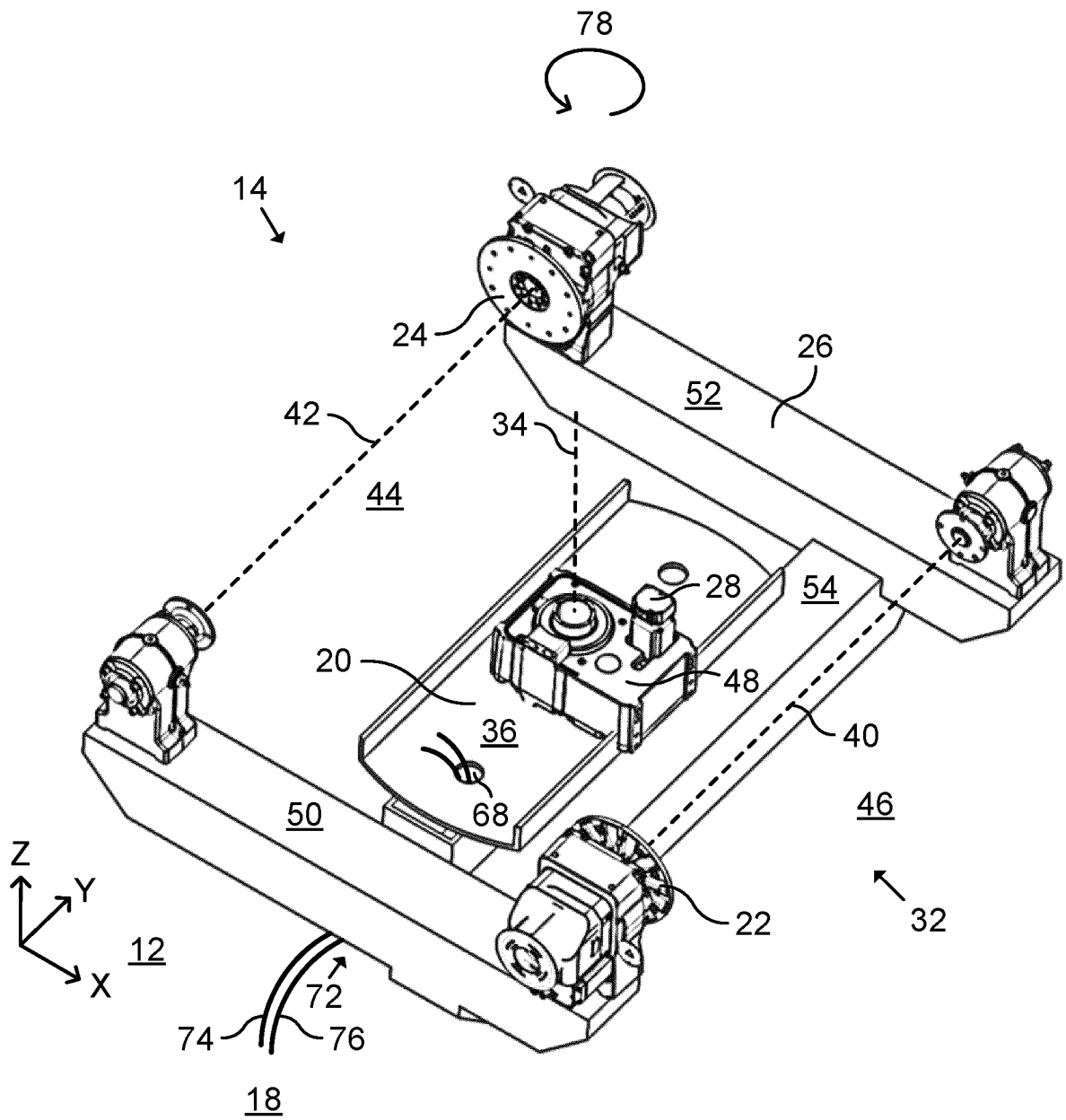
FIG. 8: schematically represents a perspective top view of the positioning apparatus in the second position.
Figure 9:
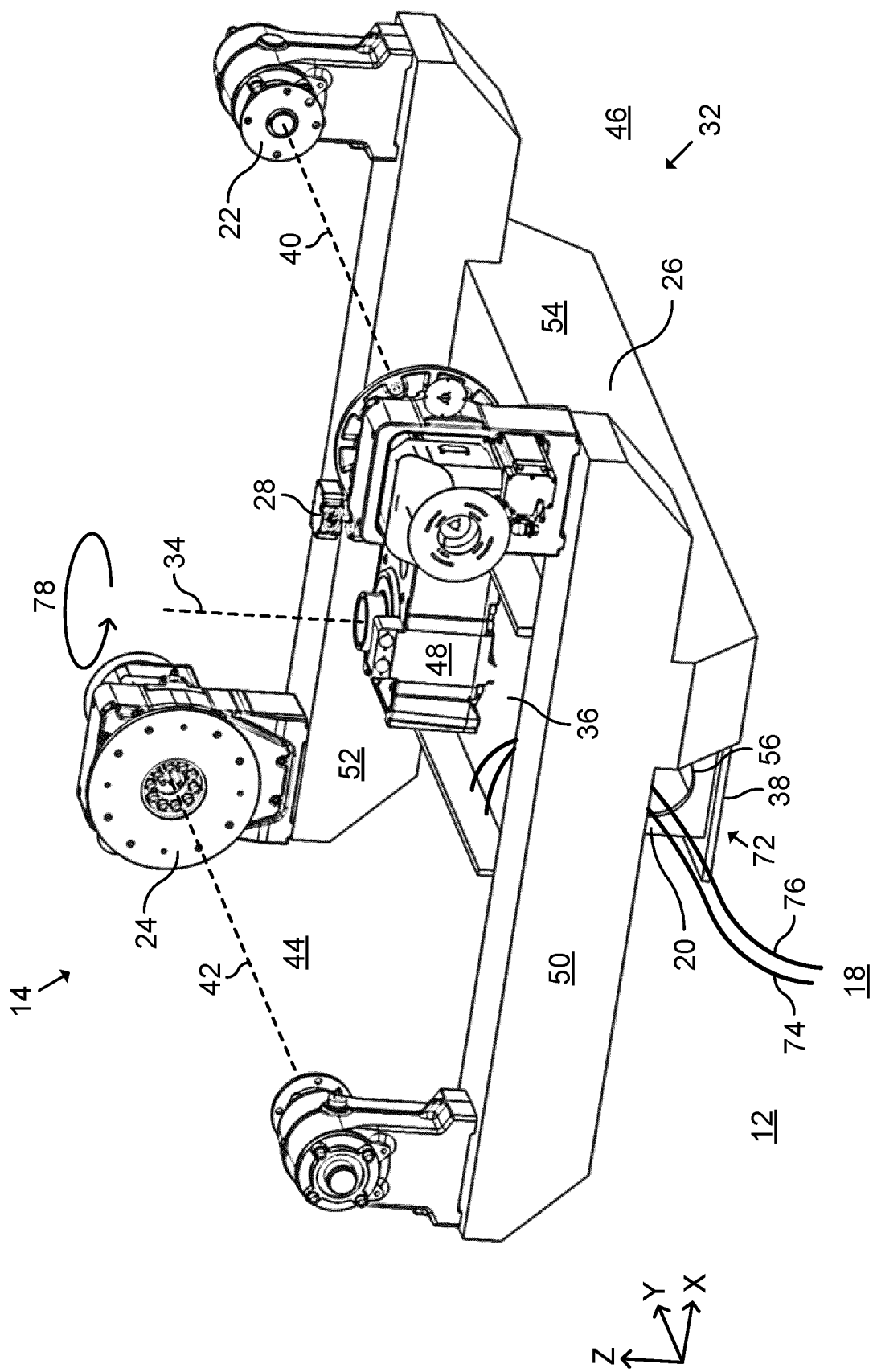
FIG. 9: schematically represents a perspective side view of the positioning apparatus in the second position.

The support member 26 is movable relative to the base structure 20 between a first position 30 (see FIGS. 1 to 5) and a second position 32 (see FIGS. 8 and 9). In FIGS. 1 and 2, the support member 26 is in the first position 30. In this example, the support member 26 is rotatable about an interchange rotation axis 34 between the first position 30 and the second position 32. The interchange rotation axis 34 of this example is perpendicular to the floor 12, i.e. vertical.

The base structure 20 comprises a support surface 36 (upper surface in FIGS. 1 and 2) and a base surface 38 (lower surface in FIGS. 1 and 2). A base of each of the first industrial robot 16a and of the second industrial robot 16b is mounted to the support surface 36. The first industrial robot 16a and the second industrial robot 16b are thereby supported on the support surface 36. The support surface 36 is larger than the base surface 38, e.g. at least 30% larger. As shown in FIGS. 1 and 2, the motor 28 is provided in a horizontal direction between the first industrial robot 16a and the second industrial robot 16b.

The base surface 38 mates with the floor 12. A base of each of the third industrial robot 16c and the fourth industrial robot 16d is mounted to the floor 12 or to a pedestal (not shown). In this example, each of the support surface 36 and the base surface 38 is planar and parallel with the floor 12, i.e. perpendicular to the interchange rotation axis 34.

The first workpiece support 22 is configured to support a first workpiece. The second workpiece support 24 is configured to support a second workpiece. In this example, the first workpiece support 22 is configured to rotate the first workpiece about a first workpiece rotation axis 40 and the second workpiece support 24 is configured to rotate the second workpiece about a second workpiece rotation axis 42, parallel with the first workpiece rotation axis 40. The first workpiece rotation axis 40 and the second workpiece rotation axis 42 are provided at the same height above the floor 12. Each of the first workpiece rotation axis 40 and the second workpiece rotation axis 42 is horizontal and thereby perpendicular to the interchange rotation axis 34. As shown in FIGS. 1 and 2, the support surface 36 is positioned below the first workpiece support 22 and the second workpiece support 24.

The positioning apparatus 14 comprises a processing side 44 and a loading side 46. The base structure 20 is provided between the processing side 44 and the loading side 46 and is fixed to the floor 12. The positioning apparatus 14 may further comprise a wall (not shown) dividing the processing side 44 and the loading side 46.

As shown in FIGS. 1 and 2, in the first position 30 of the support member 26, the first workpiece support 22 is positioned on the processing side 44 and the second workpiece support 24 is positioned on the loading side 46. A second workpiece can thereby be loaded/unloaded to/from the loading side 46 while a first workpiece is processed at the processing side 44, e.g. by means of an arc-welding operation. Due to the provision of two industrial robots 16c and 16d on the floor 12 and two industrial robots 16a and 16b on the positioning apparatus 14, the processing capacity can be increased, e.g. more weld can be added to a workpiece on the processing side 44 in a certain time.

The support member 26 can be rotated clockwise 180 degrees about the interchange rotation axis 34 from the first position 30 to the second position 32 and then rotated counterclockwise 180 degrees about the interchange rotation axis 34 from the second position 32 back to the first position 30. When welding operations and loading operations are finished, the positioning apparatus 14 changes the positions of the workpieces.

The positioning apparatus 14 further comprises a gearbox 48. The gearbox 48 is one example of a transmission according to the present disclosure. The motor 28 is arranged to drive the support member 26 between the first position 30 and the second position 32 via the gearbox 48. The gearbox 48 of this example is a reduction gearbox connected to an output shaft of the motor 28 and configured to transmit a driving movement of the motor 28 to a movement of the support member 26.

In this example, the gearbox 48 is mounted on top of the support surface 36 and the motor 28 is mounted on top of the gearbox 48. The support surface 36 is thus provided between the gearbox 48 and the base surface 38 and between the motor 28 and the base surface 38. This enables a low positioning of the first industrial robot 16a and the second industrial robot 16b. As a consequence, access to the workpiece on the processing side 44 is improved, the height of the second workpiece rotation axis 42 at the loading side 46 can be lowered, and the overall height of the system 10 can be reduced.

The support member 26 of this example is a rigid H-shaped frame. The support member 26 comprises a straight first arm 50, a straight second arm 52 and a straight bridging arm 54. The bridging arm 54 is connected between the first arm 50 and the second arm 52. The first arm 50 and the second arm 52 are parallel and the bridging arm 54 is perpendicular thereto. The bridging arm 54 is offset from the interchange rotation axis 34. The support member 26 is therefore asymmetric in this respect. In this example, each of the first arm 50, the second arm 52 and the bridging arm 54 is horizontal.

As shown in FIG. 2, the base structure 20 further comprises a first opening 56. The first opening 56 lies in a plane parallel with the interchange rotation axis 34. In FIG. 2 it can also be seen that the bridging arm 54 is provided in a vertical direction between the support surface 36 and the base surface 38.

Figure 3:
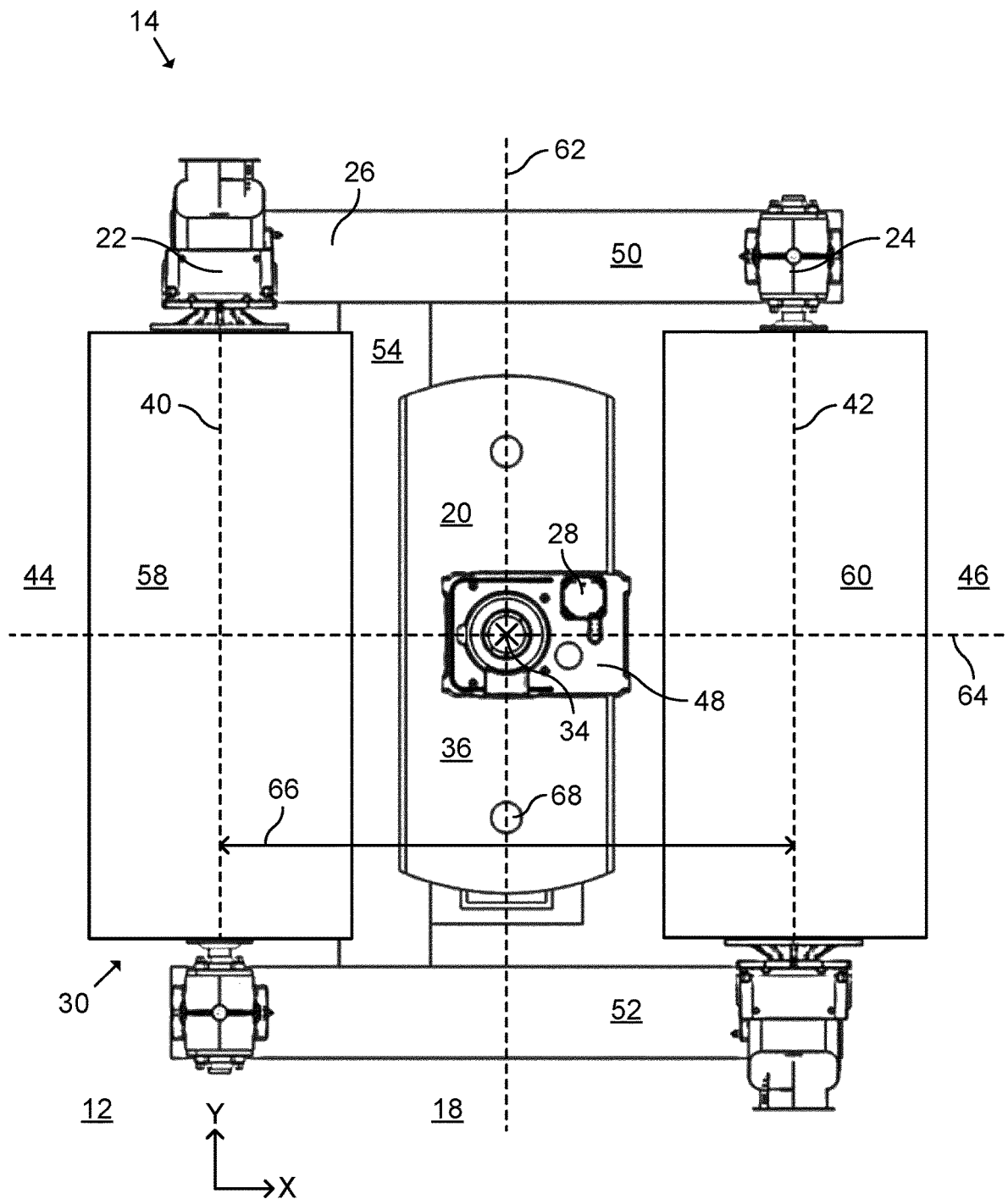
FIG. 3: schematically represents a top view of the positioning apparatus and two workpieces.

FIG. 3 schematically represents a top view of the positioning apparatus 14, a first workpiece 58 and a second workpiece 60. The first workpiece support 22 releasably holds the first workpiece 58 and the second workpiece support 24 releasably holds the second workpiece 60. In this example, each of the workpieces 58 and 60 has a cylindrical shape. Alternative types of workpieces may however be supported by the first workpiece support 22 and the second workpiece support 24. The first workpiece 58 is clamped between two first workpiece support elements (not denoted) of the first workpiece support 22, and the second workpiece 60 is clamped between two second workpiece support elements (not denoted) of the second workpiece support 24.

FIG. 3 further shows a first plane 62 and a second plane 64. Each of the first plane 62 and the second plane 64 is parallel with and comprises the interchange rotation axis 34. The first plane 62 is perpendicular to a separating direction 66 between the first workpiece support 22 and the second workpiece support 24, i.e. between the first workpiece rotation axis 40 and the second workpiece rotation axis 42. Moreover, the first plane 62 is centered between the first workpiece support 22 and the second workpiece support 24. The second plane 64 is parallel with the separating direction 66. Moreover, the second plane 64 is centered between the first arm 50 and the second arm 52.

As shown in FIG. 3, the bridging arm 54 is offset from the first plane 62 and the support member 26 is thereby asymmetric about the first plane 62. The support surface 36 is symmetric about the second plane 64.

As can be gathered from FIG. 3, the base surface 38 is asymmetric about the second plane 64. On one side of the second plane 64 (lower side in FIG. 3), an end of the support surface 36 is provided above the base surface 38. On an opposite side of the second plane 64 (upper side in FIG. 3), an end of the support surface 36 is not provided above the base surface 38. A clearance is thus provided below the support surface 36 on this side of the second plane 64 for allowing the bridging arm 54 to pass when the support member 26 moves between the first position 30 and the second position 32.

As shown in FIG. 3, the base structure 20 further comprises a second opening 68. The second opening 68 is provided in the support surface 36 and thus lies in a plane perpendicular to the interchange rotation axis 34.

Figure 4:
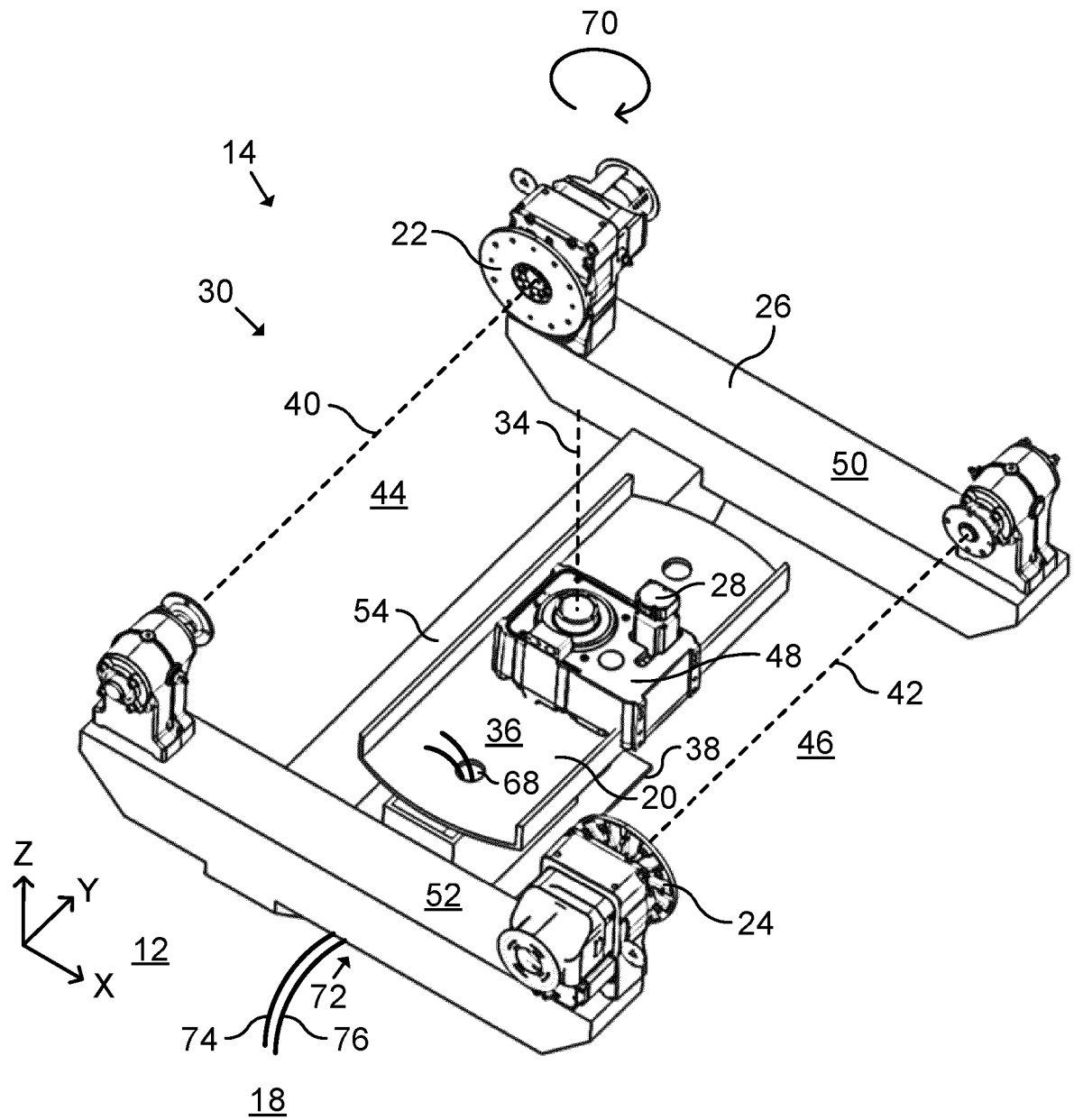
FIG. 4: schematically represents a perspective top view of the positioning apparatus in a first position.
Figure 5:
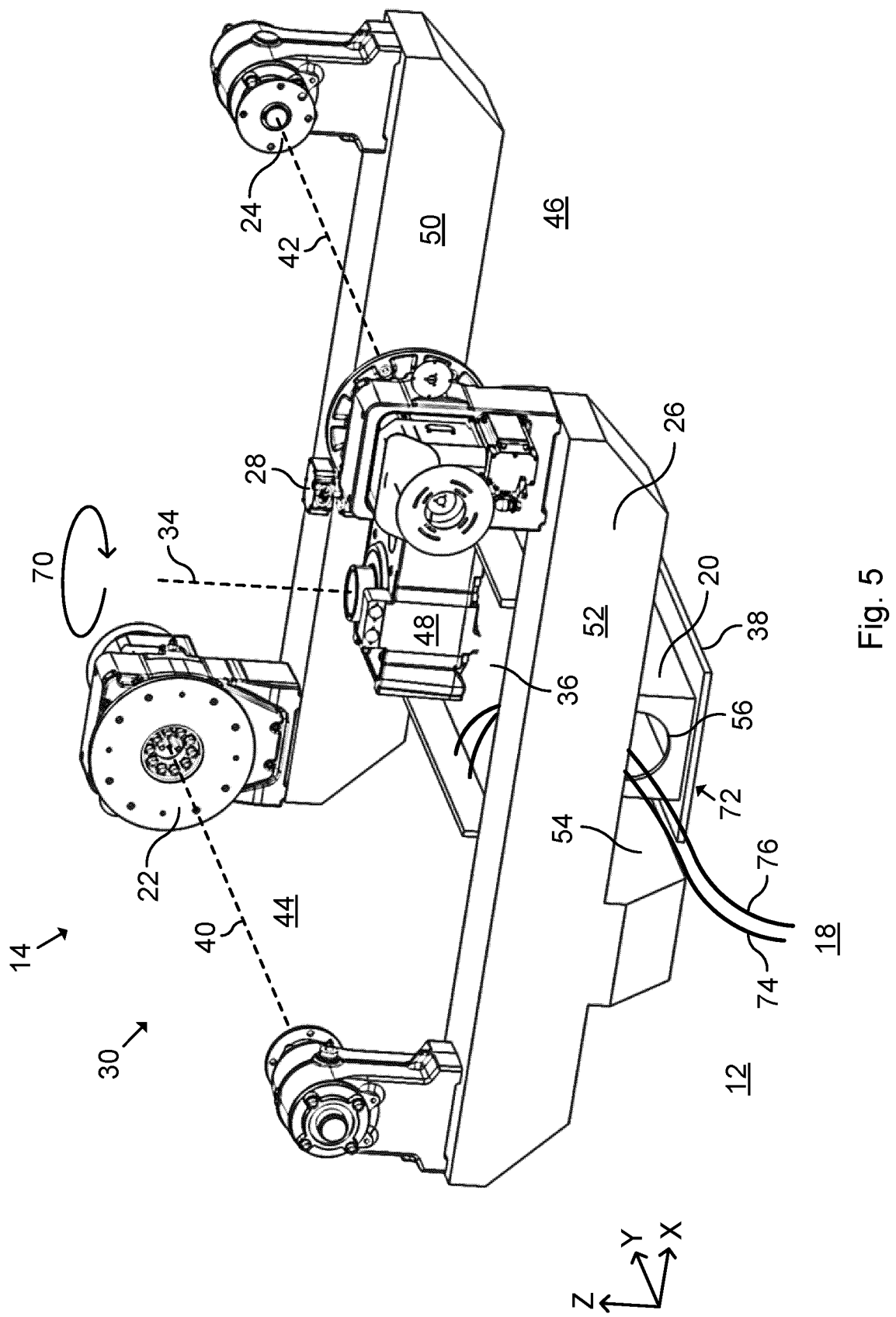
FIG. 5: schematically represents a perspective side view of the positioning apparatus in the first position.

FIG. 4 schematically represents a perspective top view of the positioning apparatus 14 in the first position 30, and FIG. 5 schematically represents a perspective side view of the positioning apparatus 14 in the first position 30. With collective reference to FIGS. 4 and 5, the support member 26 rotates about the interchange rotation axis 34 in a first direction 70 when moving from the first position 30 towards the second position 32.

The positioning apparatus 14 comprises a free space 72 and cables, here exemplified as a power cable 74 and a welding cable 76. A plurality of cables 74 and 76 are led from the exterior side 18, via the free space 72, through the first opening 56, through a passage (not visible) in the base structure 20, through the second opening 68, and to the first industrial robot 16a and the second industrial robot 16b on the support surface 36. Although only two cables 74 and 76 are illustrated, a high number of cables may be led through the free space 72 in this way.

In the first position 30 of the support member 26 in FIGS. 4 and 5, the free space 72 is located between the second arm 52 and the floor 12. Moreover, the bridging arm 54 is located on one side of the free space 72 (to the left in FIGS. 4 and 5).

The free space 72 is uninterrupted by the support member 26 when moving between the first position 30 and the second position 32. By making use of this free space 72, the routing of the cables 74 and 76 is facilitated.

FIGS. 4 and 5 further shows more clearly that each of the support surface 36 and the base surface 38 is elongated. A longitudinal axis of the support surface 36 and a longitudinal axis of the base surface 38 are each parallel with the first workpiece rotation axis 40 and the second workpiece rotation axis 42.

Figure 6:
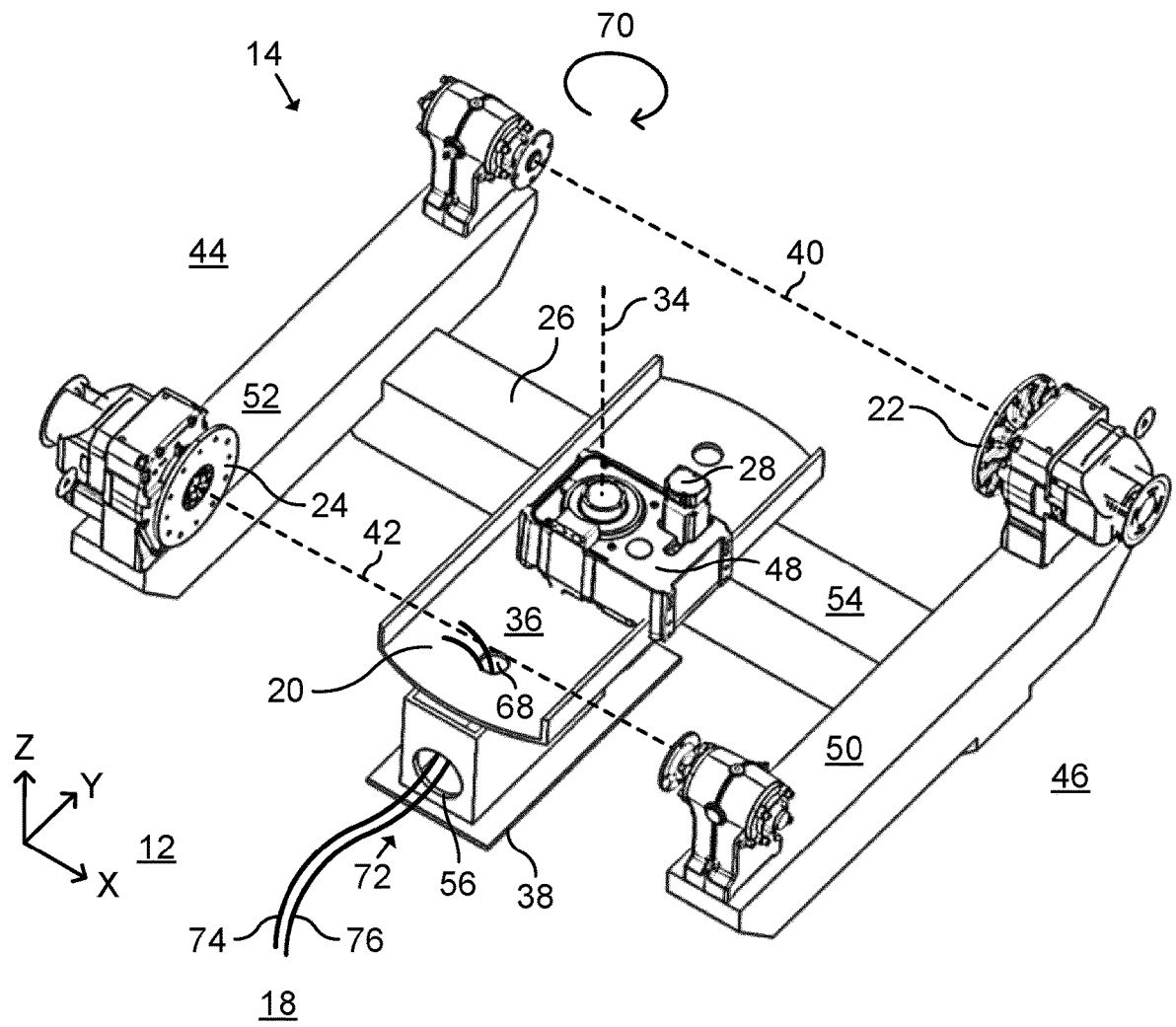
FIG. 6: schematically represents a perspective top view of the positioning apparatus during movement from the first position to a second position.
Figure 7:
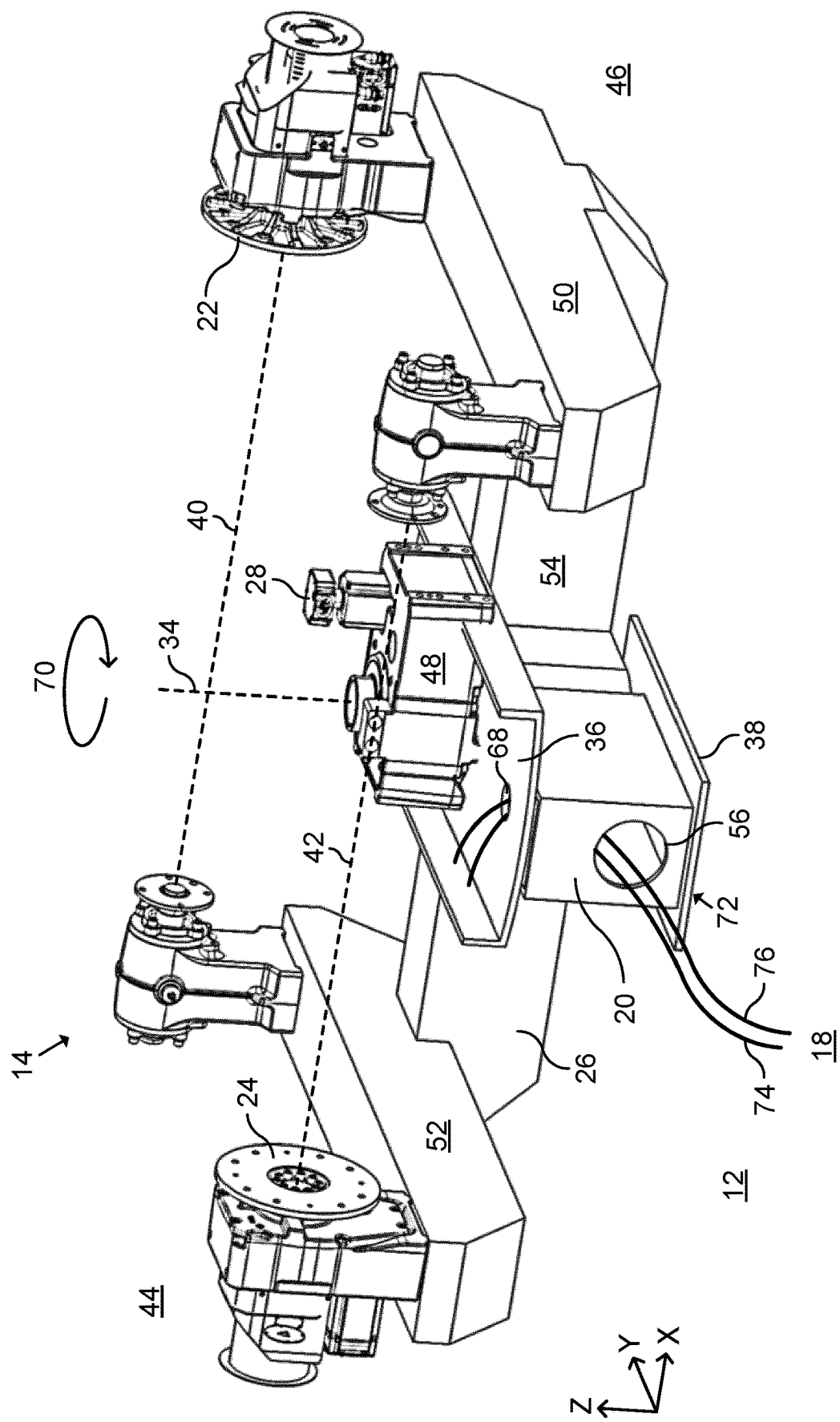
FIG. 7: schematically represents a perspective side view of the positioning apparatus during movement from the first position to the second position.

FIG. 6 schematically represents a perspective top view of the positioning apparatus 14 during movement from the first position 30 to the second position 32, and FIG. 7 schematically represents a perspective side view of the positioning apparatus 14 during movement from the first position 30 to the second position 32. With collective reference to FIGS. 6 and 7, the support member 26 moves around the base structure 20 when moving from the first position 30 towards the second position 32. The bridging arm 54 is positioned in a vertical direction between the support surface 36 and the base surface 38 during the rotation in the first direction 70. The bridging arm 54 thus moves around the base structure 20 when the support member 26 moves from the first position 30 to the second position 32.

The support member 26 rotates 180 degrees about the interchange rotation axis 34 in the first direction 70 from the first position 30 to the second position 32. During this rotation, the free space 72 is uninterrupted.

FIG. 8 schematically represents a perspective top view of the positioning apparatus 14 in the second position 32, and FIG. 9 schematically represents a perspective side view of the positioning apparatus 14 in the second position 32. With collective reference to FIGS. 8 and 9, in the second position 32, the second workpiece support 24 supporting the second workpiece 60 is now positioned on the processing side 44, and the first workpiece support 22 supporting the first workpiece 58 is positioned on the loading side 46. The first workpiece 58, which has been processed by the industrial robots 16a, 16b, 16c and 16d, can now be removed from the first workpiece support 22, and a third workpiece can be added to the first workpiece support 22 while the second workpiece 60 is being processed by the industrial robots 16a, 16b, 16c and 16d at the processing side 44.

In the second position 32 of the support member 26 in FIGS. 8 and 9, the free space 72 is located between the first arm 50 and the floor 12. Moreover, the bridging arm 54 is now located on an opposite side of the free space 72 (to the right in FIGS. 8 and 9) in comparison with in the first position 30.

The support member 26 then rotates about the interchange rotation axis 34 in a second direction 78 when moving from the second position 32 towards the first position 30. During this movement, the support member 26 rotates 180 degrees about the interchange rotation axis 34 in the second direction 78 from the second position 32 back to the first position 30. Rather than a continuous rotation, the support member 26 thus rotates alternatingly in the first direction 70 and in the second direction 78 when moving between the first position 30 and the second position 32.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A positioning apparatus for positioning workpieces in relation to at least one industrial robot, the positioning apparatus comprising:
   a stationary base structure having a support surface for supporting one or more of the at least one industrial robot and a base surface for mounting to an installation surface;
   a first workpiece support for supporting a first workpiece;
   a second workpiece support for supporting a second workpiece;
   a support member supporting the first workpiece support and the second workpiece support, the support member being arranged to move between a first position, where the first workpiece support is positioned on a processing side of the base structure and the second workpiece support is positioned on an opposite loading side of the base structure, and a second position, where the first workpiece support is positioned on the loading side and the second workpiece support is positioned on the processing side; and
   a motor arranged to drive the support member between the first position and the second position, wherein the support surface is arranged between the motor and the base surface; and
   wherein the support member is asymmetric about a plane that is perpendicular to a separating direction between the first workpiece support and the second workpiece support and that is centered between the first workpiece support and the second workpiece support.

2. The positioning apparatus according to claim 1, wherein the support member is arranged to rotate about an interchange rotation axis between the first position and the second position.

3. The positioning apparatus according to claim 2, wherein the support member is arranged to rotate approximately 180 degrees about the interchange rotation axis in a first direction from the first position to the second position, and to rotate approximately 180 degrees about the interchange rotation axis in a second direction, opposite to the first direction, from the second position to the first position.

4. The positioning apparatus according to claim 3, further comprising a free space for guiding one or more cables from an exterior side of the positioning apparatus to the base structure, wherein the positioning apparatus is configured such that the free space is uninterrupted by the support member when moving between the first position and the second position.

5. The positioning apparatus according to claim 2, further comprising a free space for guiding one or more cables from an exterior side of the positioning apparatus to the base structure, wherein the positioning apparatus is configured such that the free space is uninterrupted by the support member when moving between the first position and the second position.

6. The positioning apparatus according to claim 5, wherein the base structure comprises a first opening and a second opening for guiding the one or more cables from the exterior side to the support surface.

7. The positioning apparatus according to claim 2, wherein the support member comprises a first arm, a second arm and a bridging arm interconnecting the first arm and the second arm, the bridging arm being substantially perpendicular to each of the first arm and the second arm.

8. The positioning apparatus according to claim 2, wherein the support member is H-shaped.

9. The positioning apparatus according to claim 1, wherein the support member comprises a first arm, a second arm and a bridging arm interconnecting the first arm and the second arm, the bridging arm being substantially perpendicular to each of the first arm and the second arm.

10. The positioning apparatus according to claim 9, when the support member is arranged to rotate about an interchange rotation axis between the first position and the second position, wherein the bridging arm is offset from the interchange rotation axis.

11. The positioning apparatus according to claim 1, wherein the support member is H-shaped.

12. The positioning apparatus according to claim 1, wherein the support surface is positioned between the first workpiece support and the base surface.

13. The positioning apparatus according to claim 1, wherein the first workpiece support is arranged to rotate the first workpiece about a first workpiece rotation axis, and wherein the support surface is positioned between the first workpiece rotation axis and the base surface.

14. The positioning apparatus according to claim 1, further comprising a transmission arranged to transmit a driving movement of the motor to a movement of the support member, wherein the support surface is arranged between the transmission and the base surface.

15. A system comprising at least one industrial robot and a positioning apparatus including:
    a stationary base structure having a support surface for supporting one or more of the at least one industrial robot and a base surface for mounting to an installation surface;
    a first workpiece support for supporting a first workpiece;
    a second workpiece support for supporting a second workpiece;
    a support member supporting the first workpiece support and the second workpiece support, the support member being arranged to move between a first position, where the first workpiece support is positioned on a processing side of the base structure and the second workpiece support is positioned on an opposite loading side of the base structure, and a second position, where the first workpiece support is positioned on the loading side and the second workpiece support is positioned on the processing side; and
    a motor arranged to drive the support member between the first position and the second position, wherein the support surface is arranged between the motor and the base surface; and
    wherein the support member is asymmetric about a plane that is perpendicular to a separating direction between the first workpiece support and the second workpiece support and that is centered between the first workpiece support and the second workpiece support.

16. The system according to claim 15, wherein the system comprises two industrial robots supported on the support surface.

17. The system according to claim 16, wherein the motor is positioned between the two industrial robots.

* * * * *